United States Patent [19]

Chovin et al.

[11] Patent Number: 5,191,325
[45] Date of Patent: Mar. 2, 1993

[54] PROGRAMMABLE RELAY CONTROL DEVICE

[75] Inventors: André Chovin, Crest; Didier Gary, Valence; Jacques Taillebois, Bourg les Valence, all of France

[73] Assignee: Sextant Avionique, Paris, France

[21] Appl. No.: 368,029

[22] Filed: Jun. 19, 1989

[30] Foreign Application Priority Data

Jun. 27, 1988 [FR] France .................. 88 08717

[51] Int. Cl.⁵ ............................................. H04Q 1/00
[52] U.S. Cl. .................. 340/825.83; 365/94
[58] Field of Search ............ 364/716, 900, 200; 307/465, 465.1; 340/825.83; 365/94

[56] References Cited

U.S. PATENT DOCUMENTS

| | | | |
|---|---|---|---|
| 4,075,707 | 2/1978 | Wilmer. | |
| 4,097,765 | 6/1978 | Zappe | 307/465 |
| 4,268,908 | 5/1981 | Logue et al. | 307/465 X |
| 4,415,818 | 11/1983 | Ogawa et al. | 340/825.83 X |
| 4,670,749 | 6/1987 | Freeman | 307/465 X |

Primary Examiner—Ulysses Weldon
Attorney, Agent, or Firm—Stevens, Davis, Miller & Mosher

[57] ABSTRACT

A programmable relay control device is provided for determining the level of at least two outputs as a function of signals present at the inputs and timing signals from a clock, comprising down-counting decades and programming and reprogramming means. This device comprises reprogrammable remanent memories and logic networks whose configuration is controlled by the outputs of said remanent memories. These logic networks comprise routing grids in which one output at most corresponds to every input, these grids receiving different input signals and intermediate variable signals and delivering parameter signals and different output signals, and a combination grid in which every output may correspond to a logic combination of the inputs, receiving said parameter signals for delivering said intermediate variable signals.

1 Claim, 5 Drawing Sheets

PROGRAMMABLE RELAY CONTROL DEVICE

BACKGROUND OF THE INVENTION

The present invention relates to a programmable relay control device. In the present description, by the term relay is meant not only an electromechanical relay but also a static relay, namely a controlled semiconductor switch.

More particularly, the present invention relates to a programmable relay control device which lends itself to numerous operations related to clock controls and/or events counting, a certain number of these operations resulting from a logic combination of input events and/or clock pulses.

Another object of the present invention is to provide such a programmable relay control device which can be formed as a monolithic integrated circuit.

Another object of the present invention is to provide such a programmable relay control device which uses, inside an integrated circuit, remanent elements operating even in the absence of supply voltage while minimizing the number of remanent elements which are generally costly in the area occupied and difficult to form inside an integrated circuit.

SUMMARY OF THE INVENTION

To attain these objects, the present invention provides a programmable relay control device for determining the level of at least two outputs as a function of signals present on the inputs and timing signals from a clock, comprising down-counting decades and programming and reprogramming means. This device comprises reprogrammable remanent memories and logic networks whose configuration is controlled by the outputs of said remanent memories. These logic networks comprise routing grids in which at most one output corresponds to every input, these grids receiving different input signals and intermediate variable signals and delivering parameter signals and different output signals and a combination grid in which every output may correspond to a logic combination of the inputs, receiving said parameter signals and delivering said intermediate variable signals.

In one embodiment of the present invention, the parameter signals are four in number and the intermediate variables two in number.

In one embodiment of the present invention, this device comprises four inputs, two down-counters, a clock with several ranges and two control outputs; the routing grids comprise a first grid receiving in particular the input signals and their complements, the output signals of the down-counters and their complements, the two intermediate variable signals one of which with its complement and delivering, on the one hand, four parameter signals chosen from the signals received to the exclusion of the intermediate variables and, on the other hand, signals for the activation and de-activation of the down-counters and outputs and a signal for activating resetting of the circuit, a second grid receiving substantially the same signals as the first and delivering condition signals for inhibiting the outputs or time down-counting, and a third grid receiving the different clock ranges, the input signals, the intermediate variables and the output signals of the down-counters and delivering one of these signals to the clock input of each down-counter; and the combination grid receives said four parameter signals and delivers said two intermediate variable signals.

BRIEF DESCRIPTION OF THE DRAWINGS

These objects, characteristics and advantages as well as others of the present invention will be clear from the following description of particular embodiments, with reference to the accompanying drawings in which.

DESCRIPTION OF THE PREFERRED EMBODIMENTS

Figure 1:
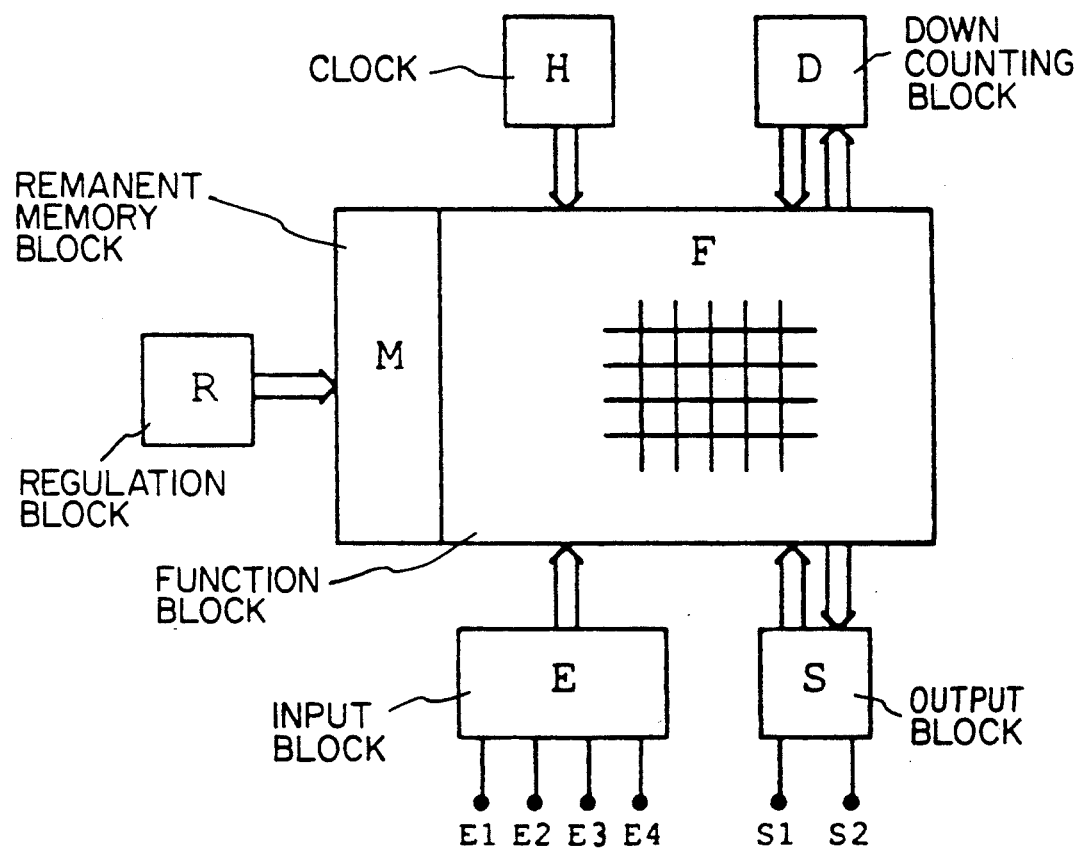
FIG. 1 is a very schematic representation in the form of blocks of the architecture of the device of the present invention.

Thus, FIG. 1 shows very generally a programmable relay control device according to the present invention. The heart of this device is formed by a function control block F which delivers output signals at an output block S comprising for example two outputs S1 and S2 adapted for controlling two relays (not shown).

The function block F receives event and control signals from an input block E and clock signals from a block H. It is associated with a down-counting block D which receives from the function block signals from the clock inputs or event inputs and in return delivers its outputs to this function block so as to act in a predetermined way on the output block S. Programming of the function block, which is formed of non remanent memory elements, for example flip-flops or simple MOS transistors, is provided by a memory block M which maintains in remanent fashion programming data delivered by a regulation block R.

The remanent memory block M comprises memory cells, preferably organized in four bit words as will be seen hereafter, which may for example be of EEPROP, NOVRAM, RAM type, safeguarded by a battery or supercapacitor, etc.

This general organization of a device in accordance with the present invention will be explained in greater detail with reference to FIG. 2 within the framework of a particular embodiment of the present invention.

The function block F, which forms the heart of the device of the present invention, receives clock signals from a time base block H connected to a quartz Q. This clock comprises several outputs delivering timing pulses at different rates, for example outputs G1 to G6. Clock H also receives an input from the function block, called CDT, which corresponds to a time down-counting condition. The timing ranges G1 to G6 may for example go from 0.1 second to one hour.

The down-counting block D of FIG. 1 is in the form of two down-counters D1 and D2 each of which comprises a gate input DD (DD1, DD2), a setting input AD (AD1; AD2), a clock input HD (HD1; HD2), an output SD (SD1, SD2), and a preselection input PR (PR1, PR2). A cascading input CAS makes it possible for the two down-counters to operate as a single down-counter of greater capacity. All these inputs and outputs are coupled to the function block F.

The input and output blocks E and S of FIG. 1 are grouped together in the form of a single block E/S which receives four external event inputs E1 to E4 and retransmits them to the function block F. On the other hand, this block delivers two control outputs S1 and S2 each of which is conditioned by inputs from the function block, namely an input AS for activating the output (AS1, AS2), an input DS for de-activating the output (DS1, DS2) and an input CS for inhibiting the output (CS1, CS2).

Furthermore, as was mentioned above the function block F is coupled to a remanent memory block MR providing, at switch on, the suitable connections of the grids contained in the function block. With the function block is also associated a volatile memory block MV providing intermediate storage, particularly during adjusting or programming and display phases. The storage block MR is programmed initially by the output of a block PR associated by a bus with a regulation block R actuated by push buttons which will not be described in detail for its function is conventional.

Figure 2:
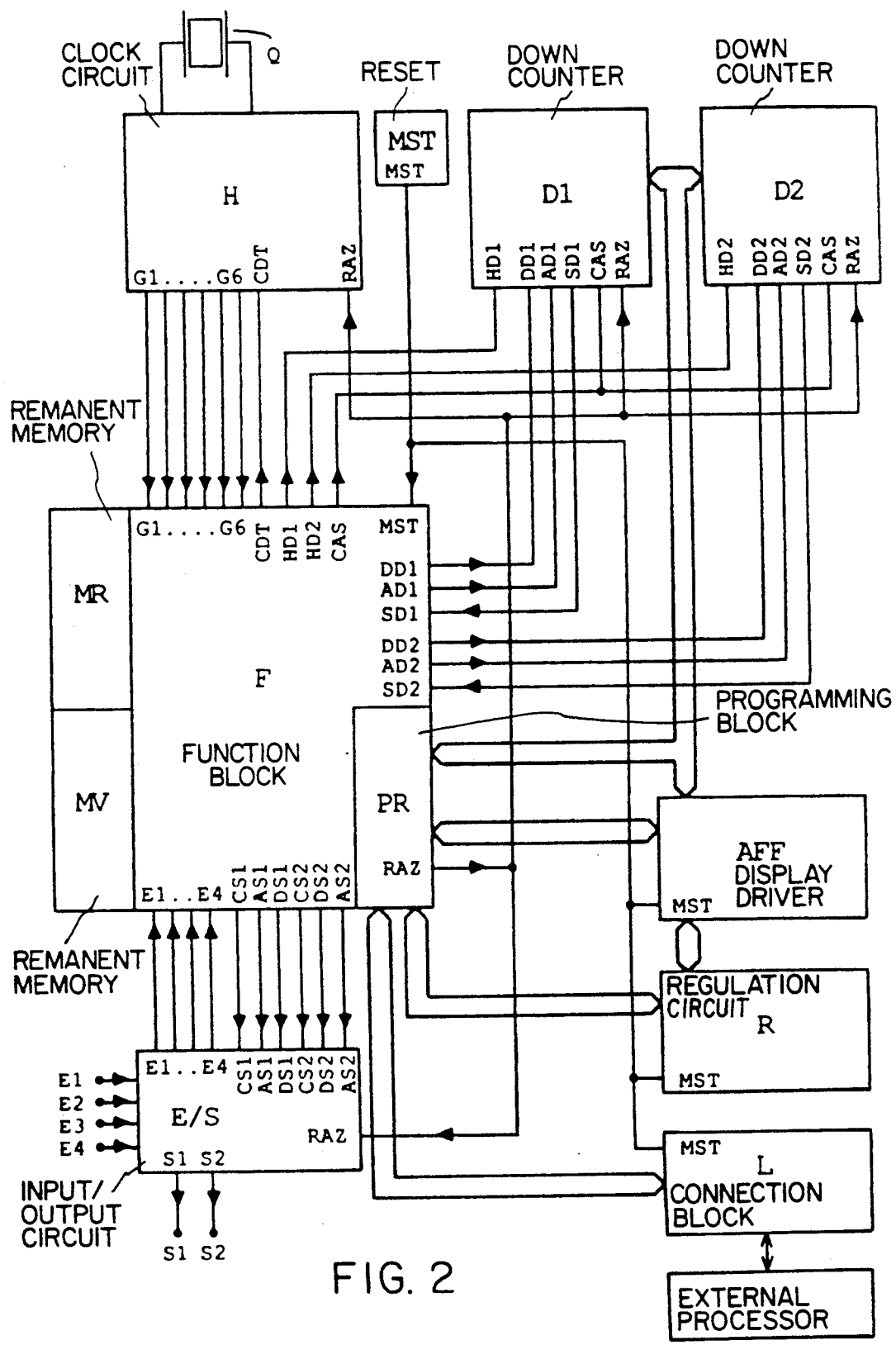
FIG. 2 is a block diagram showing in greater detail one embodiment of the present invention.

Furthermore, in FIG. 2, a display block AFF has been shown coupled to the regulation block R, to the block PR and to the down-counting block D, in a conventional way. A connection block L connects the programming block PR to an external processor in the case where the adjusting or programming is carried out automatically or else when it is desired to make tests. Moreover, the different blocks mentioned above are reset either on switch on through the block MST, or by the signal RAZ from the function block F. A bus has also been shown connecting block PR to the down-counters D1 and D2 for preselection thereof and display of their condition.

FUNCTION BLOCK

The structure of the function block and the method of programming same will be described hereafter in greater detail for it is one of the advantages of the present invention to provide a structure which may be formed as an integrated circuit using a minimum of remanent memory elements.

The function block is formed of condition grids. Each grid is formed of a matrix network of lines and columns, each intersection of which is a semiconductor element with controlled opening and closing, for example an MOS transistor or a flip-flop making it possible to establish a connection between one or more lines and one or more columns.

So-called routing grids will be distinguished hereafter, in which a single connection is possible on a given line and on a given column, and so-called combination grids in which connections are possible at several points of a line and/or a column for delivering Boolean combinations of input data.

The combination grids require individual addressing of each of the intersection points of the lines and the columns whereas, for the routing grids, addressing may be employed for reducing the number of memory points required for programming them. For example, for a routing grid with sixteen lines and sixteen columns, it will be sufficient for each line to use a four bit memory word, namely an assembly of $16 \times 4 = 64$ memory bits whereas, for a combination grid of the same size, it would be necessary to use $16 \times 16$ memory bits, namely 256 memory points or 64 four bit memory words.

Thus, one of the aspects of the present invention consists in optimizing the distribution of the grids into routing grids and combination grids so as to reduce to a minimum the size of the combination grid.

Figure 3:
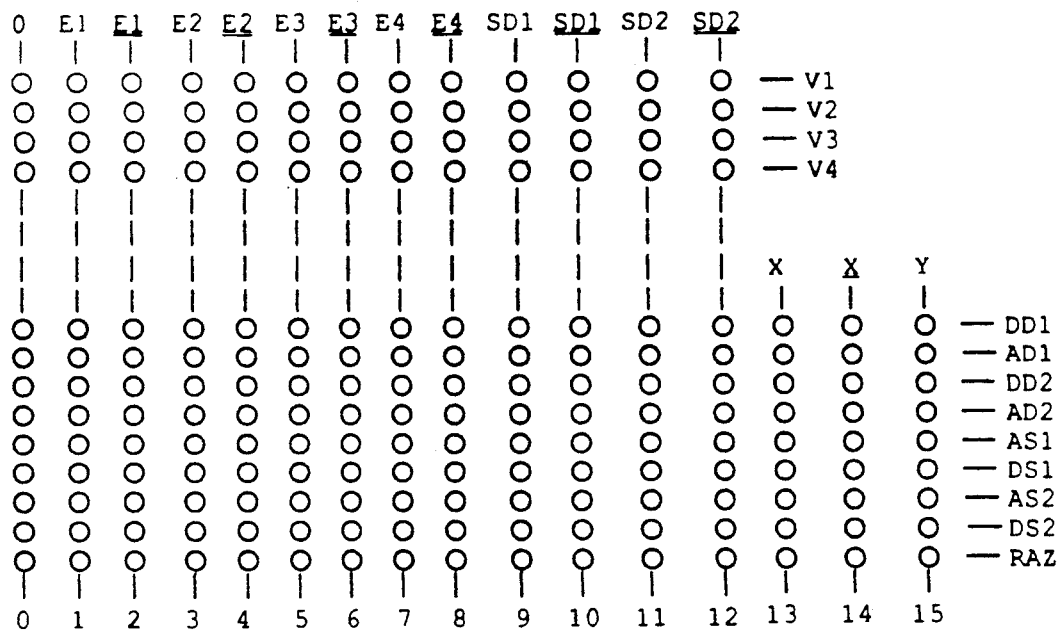
FIGS. 3 to 6 show the structure of the programming system of the present invention divided into four condition grids in the case of the particular embodiment illustrated in FIG. 2.

FIG. 3 shows a first routing grid used in the case of the embodiment of FIG. 2 for conditioning the down-counters, the outputs and the resetting. This grid comprises a first group of inputs (columns) 0, $\underline{E1}$, E2, $\underline{E2}$, E3, $\underline{E3}$, E4, $\underline{E4}$, SD1, $\underline{SD1}$, SD2, $\underline{SD2}$ (in the present description, underlined data designates this data inverted). On the other hand, this grid comprises a second group of inputs (columns) X, $\underline{X}$, Y. The inputs X, Y correspond to intermediate variables as will be described hereafter. This grid comprises four first parameter outputs V1 to V4 chosen from the first group of inputs and second outputs DD1, AD1, DD2, AD2, AS1, DS1, AS2, DS2 and RAZ chosen from the set of the two input groups.

Figure 4:
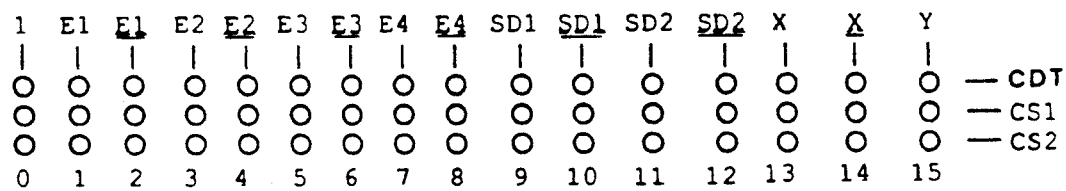

FIG. 4 shows a second routing grid which is an inhibition condition grid which delivers inhibition conditions CDT, CS1 and CS2 such as defined above from input data corresponding to the input data of the first grid unless the first column corresponds to a 1 and not to a 0.

Figure 5:
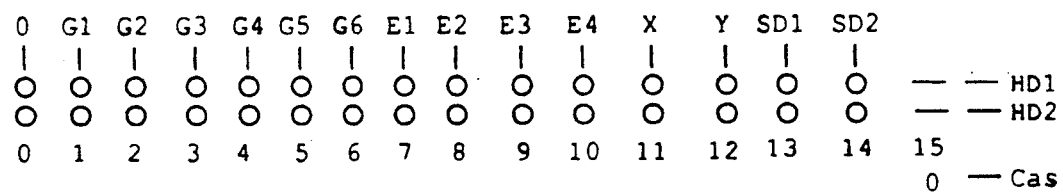

FIG. 5 shows a third routing grid or clock programming grid which receives as inputs the data 0, G1 to G6, E1 to E4, X, Y, SD1 and SD2 and outputs the above mentioned clock signals HD1 and HD2.

All these routing grids comprise sixteen columns and respectively 13, 3 and 2 lines. Thus, a four bit memory word will be necessary for programming each line, namely a total of $13 + 3 + 2 = 18$ four bit words.

Figure 6:
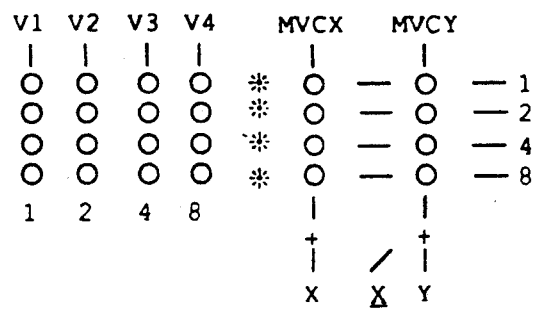
Figure 7:
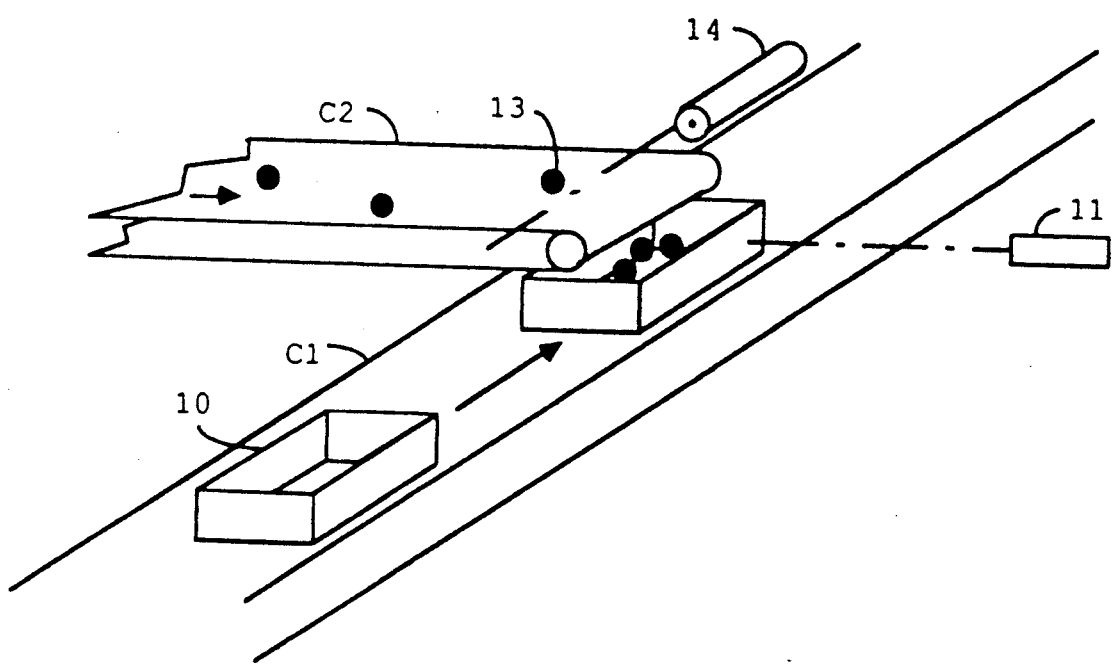
FIG. 7 illustrates one example of an automated manufacturing machine able to use for its control a device according to the present invention.

FIG. 6 shows a condition grid of the combination grid type delivering, as a function of the four parameters V1 to V4 selected from the inputs of the first group of the grid of FIG. 3, intermediate variable outputs X and Y (whence the inverse signal $\underline{X}$ may be derived if required).

This combination grid makes it possible to combine these variables V1 to V4 in the form of a sum of products (or in other words a combination of AND and OR) and in particular allows two different equations to be written comprising up to four sums of four variable products. With a memory structured in four bit words, this grid must contain 6 memory words. Each intersection of this grid may be identical to those of the routing grids (and be determined by a remanent memory point) or be a remanent memory point.

Thus, it can be seen that with the structure of the present invention only $18 + 6$, namely 24 four bit words of remanent memory need be provided. Although it is not describe in detail here, it will be advisable to add thereto three four bit words for the preselection (signals PR1 and PR2) of each of the down-counters. We arrive then at a total of remanent memory words equal to 30, namely 120 remanent memory points while making it possible to provide very vast combinations between the input signals (events, clock signals and down-counter signals).

EXAMPLE OF APPLICATION OF THE INVENTION

We will consider here by way of example a case-filling machine. Cases 10 are transported by a transporter belt C1 towards a work station associated with a case detector 11. The cases are stopped at the level of the work station situated in the off-loading zone of a second transporter belt C2 on which are loaded pieces 13 with which the case is to be filled. A detector 14 counts the number of pieces unloaded. This machine is started up by a first switch which delivers the start-up information to the block MST of FIG. 2. Then, the cycle is set off by a push button connected to the above mentioned programmable relay control device E1.

At this moment, conveyor C1, driven by the above mentioned output S1, brings a case into the filling position. The case presence detector 11, for example a cell or a contact, delivers an order for stopping the conveyor C1 which is transmitted to the above mentioned input E2.

When the case is in position, conveyor C2, actuated by the above mentioned output S2, proceeds to fill the case. During filling, the piece detector 14, a contact or a photodetector connected to the above mentioned input E3, is used for activating counting of the pieces, which is effected for example by the above mentioned down-counter D2 so as to discharge a predetermined number of pieces into each case. When down-counter D2 passes to zero, conveyor C2 stops and the cycle begins again automatically.

Furthermore, by way of safety measure, if no case is present in the filling position at the end of a chosen time T1, conveyor C1 stops automatically and the cycle can only start again by pressing the cycle beginning push button whose information is delivered to input E1. Counting of time T1 is provided by down-counter D1 in relation with a clock signal input. Thus, conveyor C1 should start up as soon as the cycle beginning signal is detected or as soon as a case is filled (which corresponds with the preceding notations to the presence of a signal at input E1 or to the end of down-counting output of down-counter D2 which, for example, is adjusted to 8 in the case where it is desired to place 8 pieces in each case).

Conveyor C1 stops whenever the presence of a case is detected (input E2). It also stops if, a given time after start up of conveyor C1, no case has been detected for a time interval T1, as is determined by the down-counter D1 which receives clock signals of the appropriate range.

Conveyor C2 is started up as soon as a presence detector 11 detects the presence of case 10, i.e. as soon as input E2 is supplied. It is stopped as soon as the down-counter D2 has finished counting, i.e. when signal $\overline{SD2}$ is delivered.

To satisfy these different requirements, it is sufficient to take as parameter signals V1 to V4, respectively, the signals E1, SD2, E2 and SD1 for delivering as signals X and Y:

$$X = V1 + V2 = E1 + SD2$$

(here the +designates an OR function)

$$Y = V3 + V4 = E2 + SD2$$

FIGS. 8 to 11 illustrate, in the same representation as FIGS. 3 to 6, the grids of the function block in their conditioning state satisfying the above mentioned functions. The crosses in these figures indicate the positions of line and column interconnections.

Figure 8:
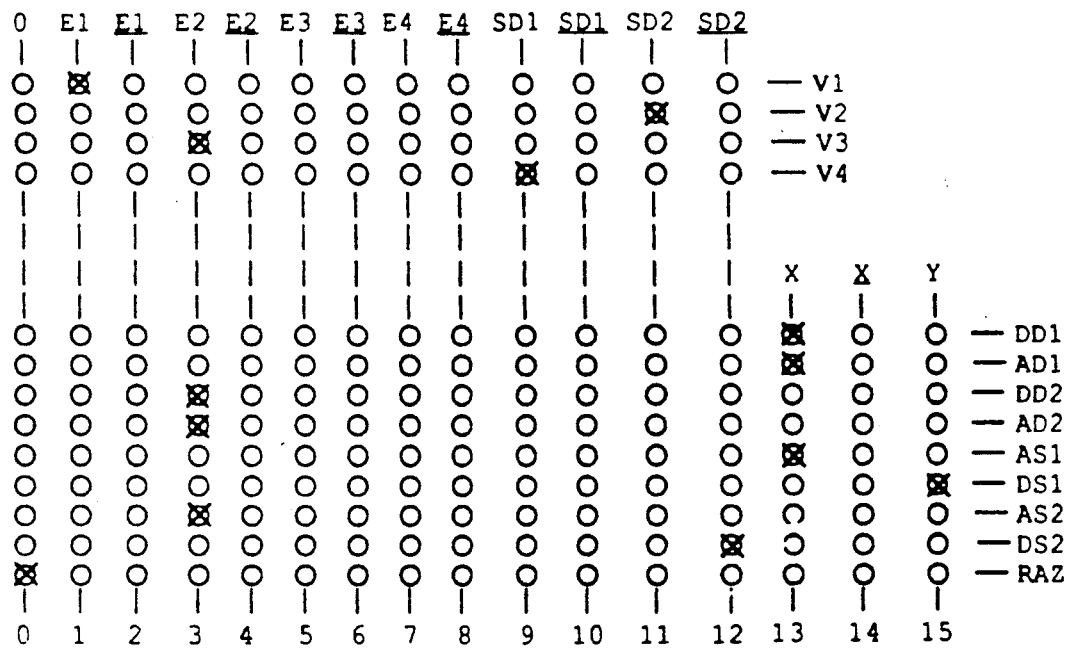
FIGS. 8 to 11 illustrate example of connecting the condition grids of FIGS. 3 to 6 in the case of the example of application of FIG. 7.

Thus, in FIG. 8, a cross can be seen which makes input E1 correspond to output V1 and similarly the input SD2 corresponds to output V2, the input E2 to output V3 and the input SD1 to output V4. These signals V1, V2, V3 and V4 are combined in the combination grid illustrated in FIG. 11 so that X corresponds to E1 OR SD2 (E1+SD2) and Y to E2 OR SD1 (E2+SD1).

Then, in the lower part of the first grid for conditioning the down-counters and the outputs illustrated in FIG. 8, it can be seen that the variable X corresponds to the outputs DD1 and AD1 (tripping and setting of down-counter D1), that signal E2 corresponds to the outputs DD2 and AD2 (tripping and setting of down-counter D2), that the variable X corresponds to the signal AS1 (activation of the output S1, starting up of conveyor C1), that the variable Y corresponds to the output DS1 (de-activation of the output S1), that the input E2 corresponds to AS2 and the signal $\overline{SD2}$ to DS2. The reset output RAZ is never used and is always connected to column 0.

Figure 9:
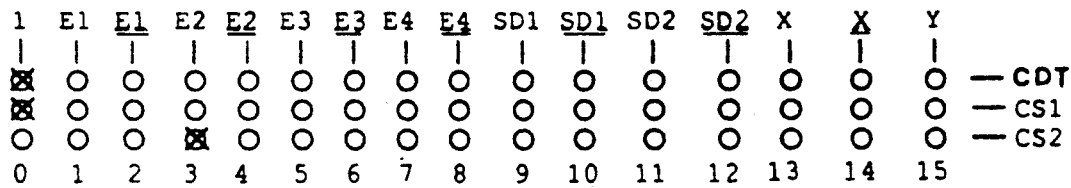

In the diagram of FIG. 9, corresponding to the inhibition condition grid, it can be seen that no particular condition is imposed on the clock (CDT) nor on the output S1 (CS1) but on the contrary that a condition is imposed on the output S2 (CS2), namely that a signal exists at input E2, i.e. the condition of the presence of a case.

Figure 10:
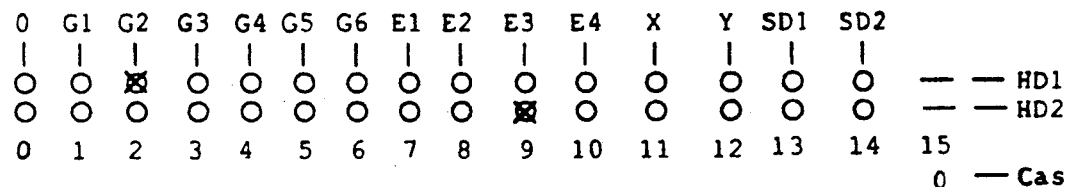
Figure 11:
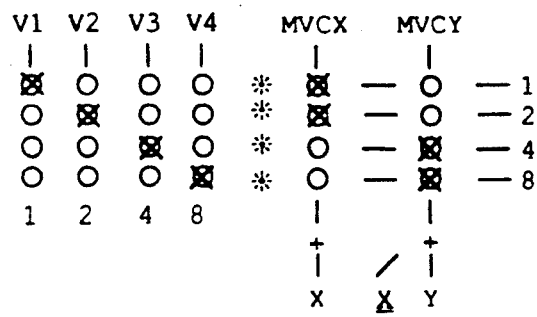

Finally, FIG. 10 represents the clock programming grid and it can be seen that the clock signal HD1 applied to down-counter D1 corresponds to the clock output G2 (range in which a pulse is delivered every second) whereas the clock signal HD2 on down-counter D2 corresponds to the signal E3, namely to the counting of pieces.

It can be clearly seen that this is one of the advantages of the device of the present invention, namely that with a very simple design orders may be mixed related to down-counting of event sequences and time down-counting.

Of course, different variants of the present invention are possible in the choice of the number of inputs and outputs as well as in the matrix implementation. Thus, in an integrated circuit, the different routing grids could be grouped together into a single network.

What is claimed is:

1. A programmable relay control device comprising device inputs and at least two device outputs, for determining a level of said device outputs as a function of signals present at said device inputs and timing signals from a clock, comprising down-counting decades for counting external events and clock pulses and programming and reprogramming means, said relay control device comprising:

a plurality of reprogrammable remanent memories having memory outputs, and a plurality of logic networks having a configuration which is controlled by said memory outputs of said remanent memories, said logic networks comprising:

routing grids having routing grid inputs and routing grid outputs and in which at most one of said routing grid outputs corresponds to every one of said routing grid inputs, said routing grids receiving different routing grid input signals and intermediate variable signals and delivering parameter signals and different routing grid output signals, a combination grid having combination grid inputs and combination grid outputs and in which every output of said combination grid may correspond to a logic combination of the inputs of said combination grid, said inputs of said combination grid receiving said parameter signals delivered by said routing grids and delivering said intermediate variable signals to said routing grids, and output means receiving at least some of said routing grid output signals and delivering said device outputs, wherein:

said parameter signals are at least four in number and said intermediate variables at least two in number, and said programmable relay control device further comprises four device inputs, two down-counters, a clock with several ranges and two control outputs, and said routing grids comprise:

a first grid receiving in particular the device input signals and their complements, the output signals of the down-counters and their complements, the two intermediate variable signals and delivering, on the one hand, four parameters selected from the signals received to the exclusion of the intermediate variables and, on the other hand, the signals for activating and de-activating the down-counters, first grid outputs and resetting, a second grid receiving substantially the same signals as the first grid and delivering condition signals for inhibiting time down-counting and output signals, and a third grid receiving the different clock ranges, the device input signals, the intermediate variables and the output signals of the down-counters and delivering one of said signals to the block input of each down-counter; and wherein the combination grid receives said four parameter signals and delivers said two intermediate variable signals.

* * * * *